United States Patent [19]

Tagami

[11] Patent Number: 5,788,249
[45] Date of Patent: Aug. 4, 1998

[54] CUTTING TOOL CHUCK FOR CHUCKING CUTTING TOOL

[76] Inventor: Tetsuro Tagami, 1976-1, Yanokuchi, Inagi-shi, Tokyo-to, Japan

[21] Appl. No.: 765,777
[22] PCT Filed: May 23, 1996
[86] PCT No.: PCT/JP96/01361
§ 371 Date: Jan. 14, 1997
§ 102(e) Date: Jan. 14, 1997
[87] PCT Pub. No.: WO96/37326
PCT Pub. Date: Nov. 28, 1996

[30] Foreign Application Priority Data

May 26, 1995 [JP] Japan .................. 7-128443

[51] Int. Cl.⁶ .................................................. B23B 31/20
[52] U.S. Cl. .................. 279/51; 279/58; 279/97; 279/103; 279/75; 409/234
[58] Field of Search ............ 279/46.7–46.9, 279/50, 51, 53, 57, 58, 97, 103, 104, 74, 75; 409/233, 234

[56] References Cited

U.S. PATENT DOCUMENTS

| | | | |
|---|---|---|---|
| 2,401,071 | 5/1946 | Hillberg | 279/51 |
| 3,055,671 | 9/1962 | Lewis et al. | 279/51 |
| 3,851,930 | 12/1974 | Mattes | 279/50 |
| 5,622,373 | 4/1997 | Tagami | 409/234 |

FOREIGN PATENT DOCUMENTS

| | | | |
|---|---|---|---|
| 2836343 | 2/1980 | Germany | 279/51 |
| 1-35765 | 11/1989 | Japan | 279/51 |
| 3-37853 | 8/1991 | Japan | 279/51 |
| 3-40497 | 8/1991 | Japan | 279/51 |

*Primary Examiner*—Stephen C. Bishop
*Attorney, Agent, or Firm*—Ladas & Parry

[57] ABSTRACT

A cutting tool chuck holds a collet so as to be easily changed. In the cutting tool chuck, a fastening collar (12) is screwed on a chuck sleeve (14). The fastening collar (12) is provided with an internal guide groove (24), deep recesses (24a) formed in a side surface of the guide groove (24), and shallow recesses (24b) formed in the same side surface. A drive shaft (16) is axially slidably fitted in the chuck sleeve (14) with end portions (26a) of a drive shaft control member (26) laterally projecting from the drive shaft (16) and fitted in the guide groove (24). A collet (20) is detachably mounted on the front end of the drive shaft (16). The fastening collar (12) is turned so as to position the end portions (26a) of the drive shaft control member (26) at positions on the side surface of the guide groove (24) other than the deep recesses (24a) to hold the collet (20) on the drive shaft (16). The fastening collar (12) is turned so as to make the end portions (26a) of the drive shaft control member (26) drop into the deep recesses (24a) formed in a side surface of the guide groove (24) so that the drive shaft (16) is moved forward to release the collet (20). Thus, the collet (20) can be fastened to and can be released from the drive shaft (16) simply by turning the fastening collar (12).

3 Claims, 9 Drawing Sheets

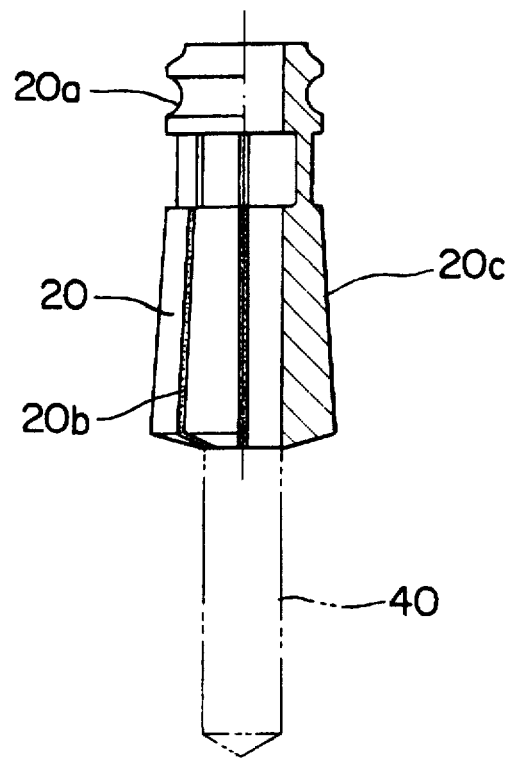
F I G. 7
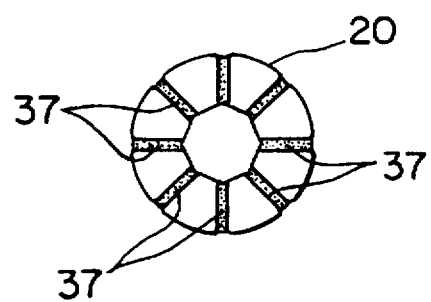
F I G. 8

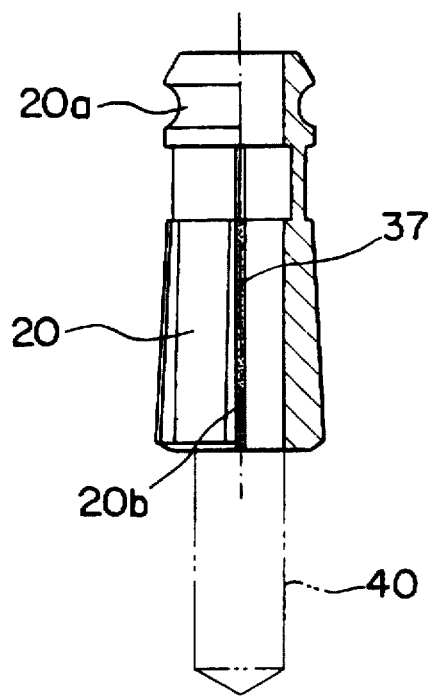
F I G. 14
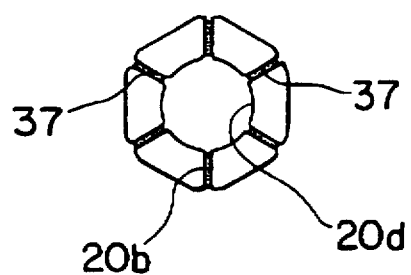
F I G. 15

5,788,249

1

CUTTING TOOL CHUCK FOR CHUCKING CUTTING TOOL

TECHNICAL FIELD

The present invention relates to a cutting tool chuck for chucking a cutting tool and, more particularly, to a cutting tool chuck for chucking cutting tools, such as drill bits, reamers and center drills.

BACKGROUND ART

A conventional cutting tool chuck for chucking cutting tools, such as drill bits, reamers and center drills, has a collet and a fastening collar. The inside diameter of the collet is reduced by the fastening collar to grip a cutting tool inserted in the bore of the collet. When changing the cutting tool, the hold of the fastening collar on the collet is loosened to allow the collet to expand, the tool is removed from the collet, another cutting tool is inserted in the collet, and then the fastening collar is adjusted to reduce the inside diameter of the collet to grip the cutting tool.

When changing the cutting tool, the collet of the conventional cutting tool chuck needs to be removed from a holding member. When replacing a collet with another collet in a conventional cutting tool chuck, the collet and a fastening collar are removed from a holding member after loosening the fastening collar, and then another collet is mounted on the holding member. When replacing a collet with another collet in another conventional cutting tool chuck, the collet is removed from a holding member after removing a fastening collar from the holding member, and then another collet is mounted on the holding member. Thus, much time and labor is necessary for changing the collet of the conventional cutting tool chuck.

Accordingly, it is an object of the present invention to solve problems in the conventional techniques and to provide a cutting tool chuck for chucking a cutting tool, having a collet which can easily be changed.

DISCLOSURE OF THE INVENTION

According to a first aspect of the present invention, a cutting tool chuck for chucking a cutting tool comprises a holding member, a chuck sleeve connected to the holding member and provided with an axial straight bore and a taper bore formed in its front end, a fastening collar screwed on the chuck sleeve and provided with an inner annular guide groove, deep recesses formed in a side surface of the guide groove, and a shallow recesses formed in the same side surface of the guide groove, a drive shaft axially slidably fitted in the chuck sleeve and provided with a drive shaft control member having opposite end portions fitted in the guide groove and capable of being brought into engagement with the deep recesses or the shallow recesses of the fastening collar, a collet detachably fitted in the taper bore of the chuck sleeve, and a spring member resiliently engaged with the back end of the drive shaft.

In this cutting tool chuck for chucking a cutting tool, a groove of a large diameter is formed in a portion of the straight bore of the chuck sleeve, a collet receiving bore is formed in the front end of the drive shaft, a plurality of balls are retained in radial holes formed in an annular wall defining the collet receiving bore so as to be radially movable between the inner and the outer circumference of the wall defining the collet receiving bore, the plurality of balls are pressed by the inner circumference of the chuck sleeve so as to protrude into the collet receiving bore to hold

2 the collet when the drive shaft is pulled up, and the plurality of balls drop into the groove of a large diameter and are pushed out of the collet receiving bore to release the collet when the drive shaft is pushed down.

According to the present invention, the fastening collar is turned so that the end portions of the drive shaft control member drop into the shallow recesses of the fastening collar and the drive shaft is pulled up to hold the collet, the fastening collar is turned so that the end portions of the drive shaft control member drop into the deep recesses of the fastening collar and the drive shaft is pushed down to release the collet. Thus, the collet can be chucked and released simply by turning the fastening collar.

According to the present invention, the plurality of balls are pushed radially inward so as to protrude into the collet receiving bore by the inner circumference of the chuck sleeve and hold the collet when the drive shaft is pulled up axially, the plurality of balls are pushed radially outward so as to be pushed out of the collect receiving bore to release the collet when the drive shaft is pushed down so that the plurality of balls drop into the groove of a large diameter. Thus, the collet can be held and released simply by axially moving the drive shaft.

According to the present invention, the collet can be chucked and released simply by turning the fastening collar. Therefore, the collet can easily be changed. Since the collet can be held and released simply by axially moving the drive shaft, the collet can easily be changed.

BRIEF DESCRIPTION OF THE DRAWINGS

FIG. 7 is a half-sectional view of a collet included in the cutting tool chuck of FIG. 1;

FIG. 8 is a bottom view of the collet of FIG. 7;

FIG. 14 is a half-sectional view of a collet in accordance with the present invention; and FIG. 15 is a bottom view of the collet of FIG. 14.

BEST MODE FOR CARRYING OUT THE INVENTION

Cutting tool chuck in preferred embodiments according to the present invention will be described hereinafter with reference to the accompanying drawings.

Figure 1:
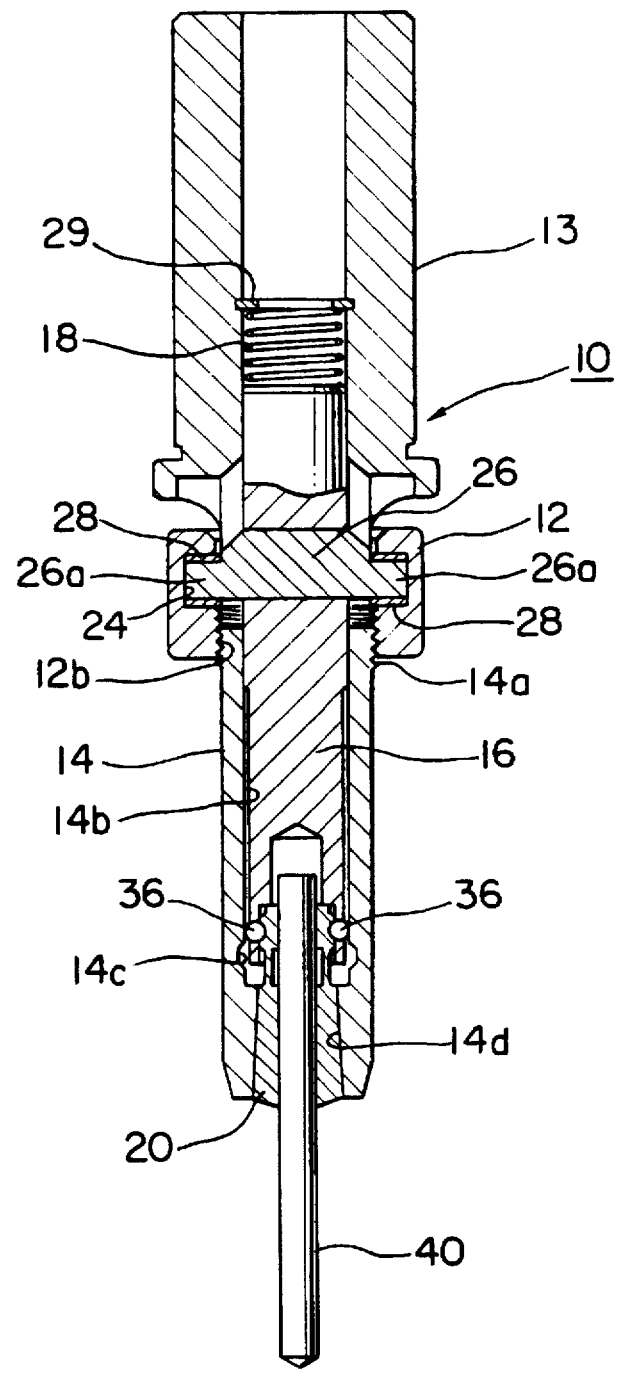
FIG. 1 is a longitudinal sectional view of a cutting tool chuck in a first embodiment according to the present invention chucking a cutting tool.
Figure 2:
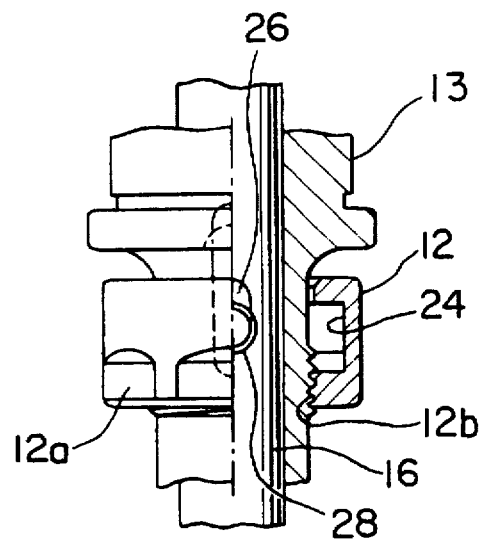
FIG. 2 is a partly sectional front view of an essential portion of the cutting tool chuck of FIG. 1.
Figure 3:
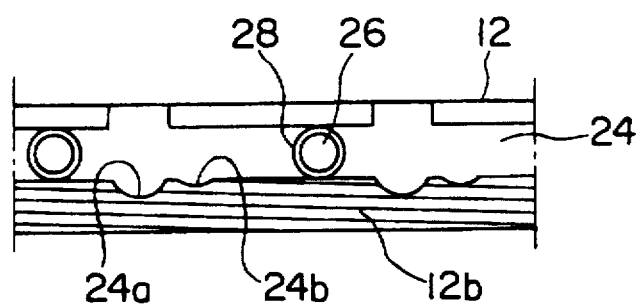
FIG. 3 is a development of the inner circumference of a fastening collar included in the cutting tool chuck of FIG. 1.

Referring to FIG. 1, a cutting tool chuck 10 has a fastening collar 12 screwed on a chuck sleeve 14 of a holding member 13 so as to be turnable. As shown in FIG. 2, the fastening collar 12 is provided in its outer circumference with opposite flats 12a with which a wrench is engaged to turn the fastening collar 12, and in its inner circumference with a female screw thread 12b. As shown in FIGS. 2 and 3, the fastening collar 12 is provided in its inner circumference with an annular guide groove 24, and deep recesses 24a and shallow recesses 24b formed in the lower side surface of the guide groove 24.

As shown in FIG. 1, the female thread 12b of the fastening collar 12 is in engagement with a male screw thread 14a formed in the outer circumference of the chuck sleeve 14. The chuck sleeve 14 has a straight bore 14b, a releasing groove 14c of a large diameter formed in its inner circumference, and a taper bore 14d formed in its front portion. The diameter of the taper bore 14d increases gradually toward the front end of the chuck sleeve 14.

A drive shaft 16 is axially slidably fitted in the chuck sleeve 14. A drive shaft control pin 26 is extended across the drive shaft 16 so that the opposite end portions 26a thereof project laterally from the drive shaft 16. Collars 28 are put on the end portions 26a of the drive shaft control member 26 so as to roll in the guide groove 24. The collars 28 are able to drop into the deep recesses 24a or the shallow recesses 24b selectively.

A compression spring 18 is compressed between the upper end of the drive shaft 16 and a stop ring 29 fitted in an annular groove formed in the inner circumference of the holding member 13 to bias the drive shaft 16 toward the front end of the chuck sleeve 14.

Figure 4:
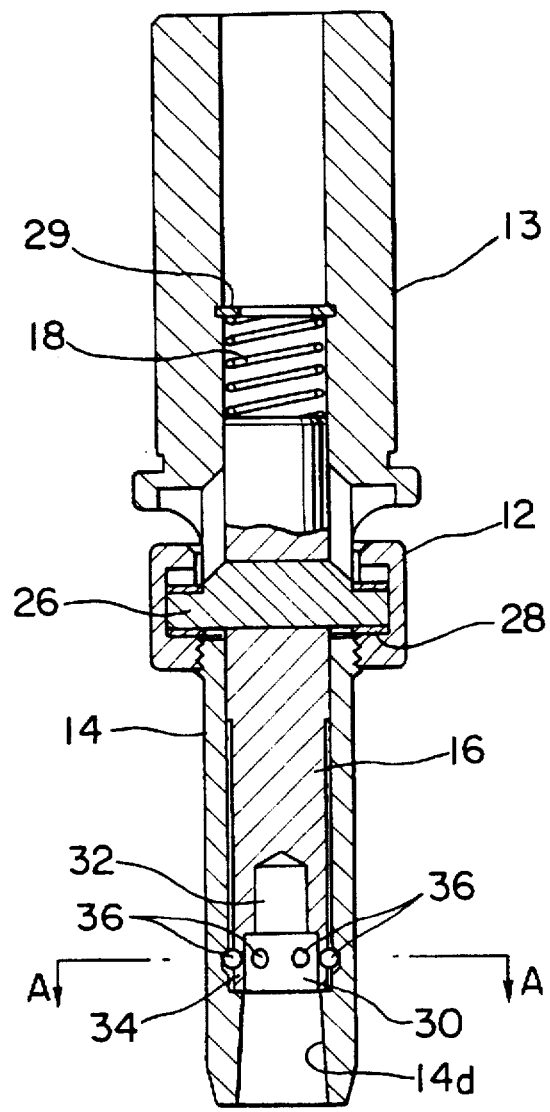
FIG. 4 is a longitudinal sectional view of the cutting tool chuck of FIG. 1, in which a collet is removed.
Figure 5:
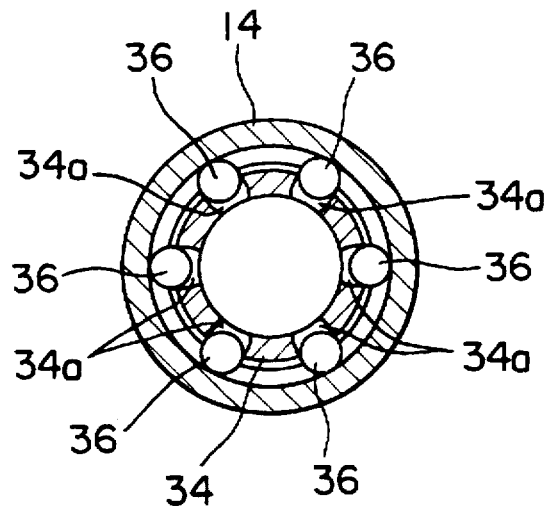
FIG. 5 is a cross-sectional view taken on line A—A in FIG. 4.
Figure 6:
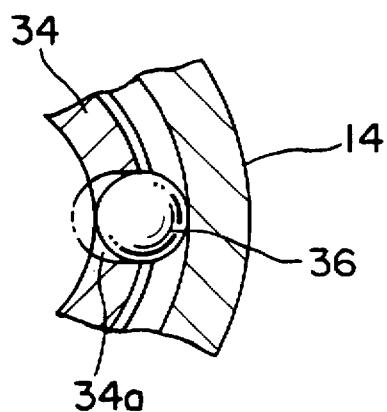
FIG. 6 is a fragmentary cross sectional view of the cutting tool chuck of FIG. 1 of assistance in explaining the operation of balls included in the cutting tool chuck.

As best shown in FIG. 4, a collet receiving bore 30 and a clearance hole 32 are formed coaxially in the front end portion of the drive shaft 16. The collet receiving bore 30 is defined by an annular wall 34, and retaining holes 34a are formed at predetermined angular intervals in the annular wall 34 as shown in FIGS. 5 and 6. Balls 36 are put in the retaining holes 34a so as to be radially movable therein. Preferably, the retaining holes 34a are formed so that the balls 36 are unable to drop into the collet receiving bore 30.

As shown in FIG. 1, an upper portion of a substantially cylindrical collet 20 is fitted in the collet receiving bore 30. A ball receiving groove 20a (FIG. 7) is formed in the outer circumference of an upper end portion of the collet 20. When the balls 36 are pushed into the collet receiving bore 30 so as to engage the ball receiving groove 20a, the collet 20 is retained in the collet receiving bore 30 by the balls 36. When the balls 36 are pushed out of the collet receiving bore 30, the balls 36 are disengaged from the ball receiving groove 20a to release the collet 20 so that the collet 20 can be extracted from the collet receiving bore 30.

Slits 20b are formed in the collet 20, and the slits 20b are packed with packing members 37 of rubber or the like (FIG. 8). The packing members 37 allows the collet 20 to expand and contract, protects the collet 20 from breakage and prevents the entrance of chips into the slits 20b. A tapered portion 20c in which the slits 20b are formed has the shape of a truncated circular cone, and the outer surface of the tapered portion 20c is tapered in a taper corresponding to that of a taper bore 14d of the chuck sleeve 14.

A method of using the cutting tool chuck of the present invention thus constructed will be described hereinafter.

In a state where the collet 20 is held on the chuck sleeve 14 as shown in FIG. 1, the fastening collar 12 is turned to bring the end portions 26a of the drive shaft control member 26 into alignment with the deep recesses 24a formed in the lower side surface of the guide groove 24. Then, the end portions 26a of the drive shaft control member 26 are pressed into the deep recesses 24a by the resilience of the compression spring 18 and the drive shaft 16 is moved toward the front end of the chuck sleeve 14. Consequently, the balls 36 are able to radially outward into the releasing groove 14c of the chuck sleeve 14 and are forced out of the ball receiving groove 20a of the collet 20 and the collet receiving bore 30, so that the collet 20 is released from the balls 36 and can be extracted from the collet receiving bore 30.

Then, an upper end portion of new collet 20 to be chucked by the cutting tool chuck 10 is fitted in the collet receiving bore 30, the fastening collar 12 is turned to shift the end portions 26a of the drive shaft control member 26 from the deep recesses 24a to the shallow recesses 24b formed in the lower side surface of the guide groove 24. Then, the drive shaft 16 is pulled up against the resilience of the compression spring 18, the balls 36 are pushed into the collet receiving bore 30 and the ball receiving groove 20a of the collet 20 by the circumference of the straight bore 14b of the chuck sleeve 14 to retain the collet 20 in the collet receiving bore 30.

When thus inserted in the collet receiving bore 30, the collet 20 is in an expanded state for chucking a cutting tool 40. The cutting tool 40 is inserted in the collet 20, the fastening collar 12 is turned to move the end portions 26a of the drive shaft control member 26 from the shallow recesses 24b formed in the lower surface of the guide groove 24 to pull up the drive shaft 16 further against the resilience of the compression spring 18. Consequently, the outer circumference of the tapered portion 20c is pressed against the surface of the taper bore 14d, and the collet 20 is contracted t grip the cutting tool 40.

Thus, the collet 20 can be held on and released from the drive shaft 16 simply by turning the fastening collar 12 and hence the collet 20 can easily be changed. The positional relation between the deep recesses 24a and the shallow recesses 24b formed in the lower side surface of the guide groove 24, and the end portions 26a of the drive shaft control member 26 is determined so that the collet 20 is held in the collet receiving bore 30 and the cutting tool 40 can be chucked by turning the fastening collar 12 through about an angle of 120° in one direction after inserting the collet 20 in the collet receiving bore 30 and inserting the cutting tool 40 in the collet 20, and the cutting tool 40 is released from the collet 20 and the collet 20 is released from the drive shaft 16 by turning the fastening collar 12 in the opposite direction.

In the first embodiment, the diameter of the straight bore 14b of the chuck sleeve 14 is substantially equal to the outside diameter of the drive shaft 16. In a cutting tool chuck of FIG. 9 in a second embodiment according to the present invention, the outside diameter of a drive shaft 16 is far less than the inside diameter of a chuck sleeve 14.

Figure 9:
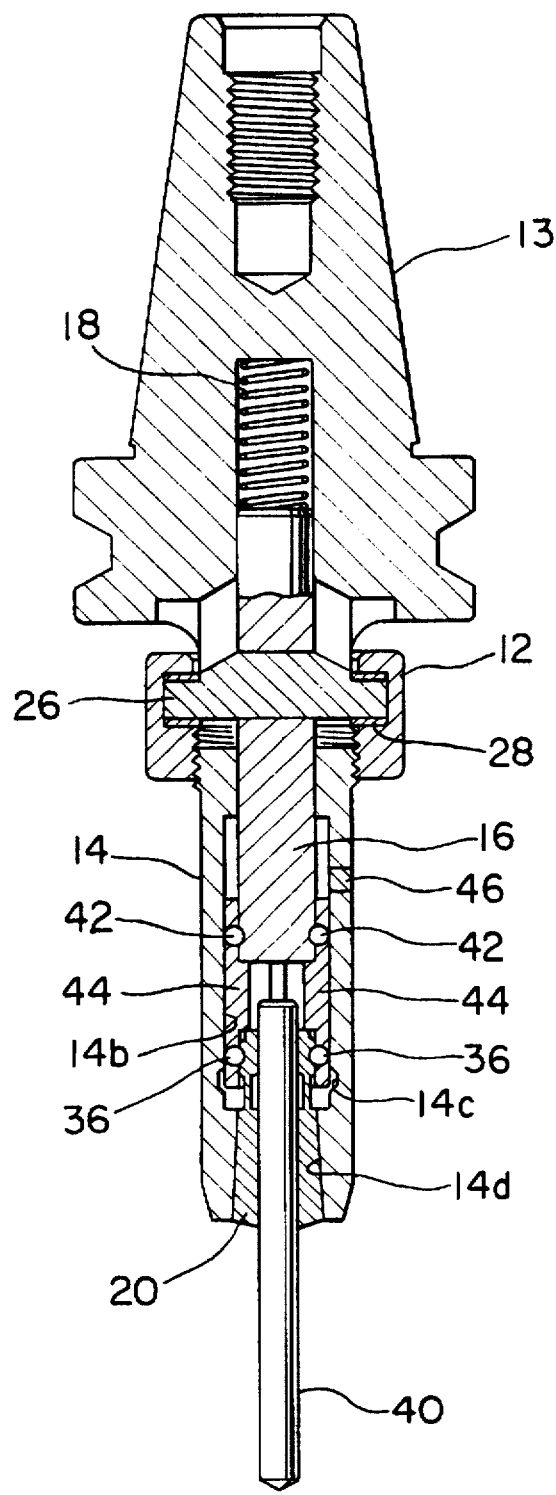
FIG. 9 is a longitudinal sectional view of a cutting tool chuck in a second embodiment according to the present invention.

In the second embodiment shown in FIG. 9, the drive shaft 16 has a diameter slightly smaller than the diameter of the small end of a taper bore 14d formed in the chuck sleeve 14. A lower end portion of the drive shaft 16 is interlocked with a connecting tube 44 with interlocking balls 42. A plurality of holes for retaining the interlocking balls 42 are formed in an upper end portion of the connecting tube 44, and the interlocking balls 42 retained in the plurality of holes of the connecting tube 44 are in engagement with an annular groove formed in the lower end portion of the drive shaft 16 to interlock the lower end portion of the drive shaft 16 with the connecting tube 44.

A plurality of retaining holes, which correspond to the retaining holes 34a of the annular wall 34 of the drive shaft 16 employed in the first embodiment, are formed in a lower end portion of the connecting tube 44, and balls 36 are retained in the retaining holes so as to project from the outer circumference or the inner circumference of the connecting tube 44. In FIG. 9, indicated at 46 is a hole through which the balls 42 are put in the retaining holes formed in the upper end portion of the connecting tube 44.

The cutting tool chuck in the second embodiment thus constructed has effects similar to that of the cutting tool chuck in the first embodiment. The balls 36 are pushed radially inward so as to protrude from the inner circumference of the connecting tube 44 into the annular groove 20a of the collet 20 to hold the collet 20 in the connecting tube 44 with the balls 36. The balls 36 are pushed radially outward so as to move out of the annular groove 20a to release the collet 20 from the connecting tube 44.

The holding member 13 may be a straight shank as that employed in the first embodiment or a taper shank employed in the second embodiment shown in FIG. 9.

In the foregoing embodiments, the outer taper surface of the collet 20 is in direct contact with the taper surface of the taper bore 14d of the chuck sleeve 14. A cutting tool chuck in accordance with the present invention may employ chuck sleeve 14, a collet 20, and a plurality of rollers 51 held by a retainer 50 and interposed between the collet 20 and the chuck sleeve 14 as shown in FIGS. 10 to 15.

Figure 10:
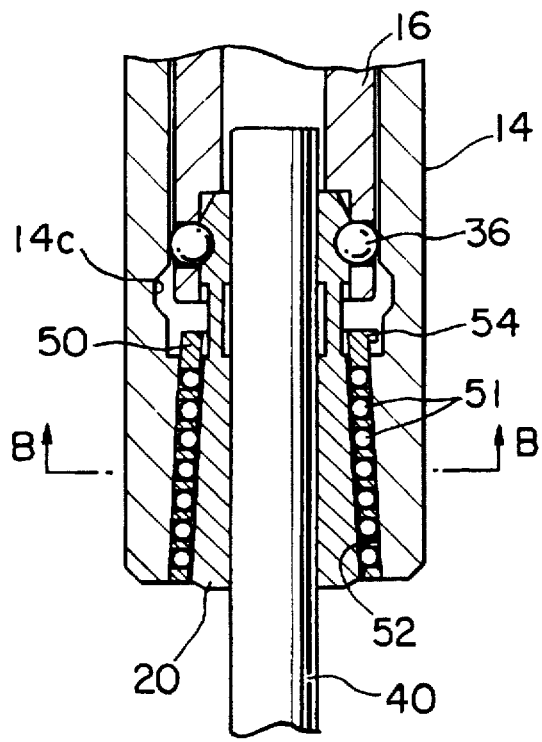
FIG. 10 is a fragmentary longitudinal sectional view of the cutting tool chuck of FIG. 9.
Figure 11:
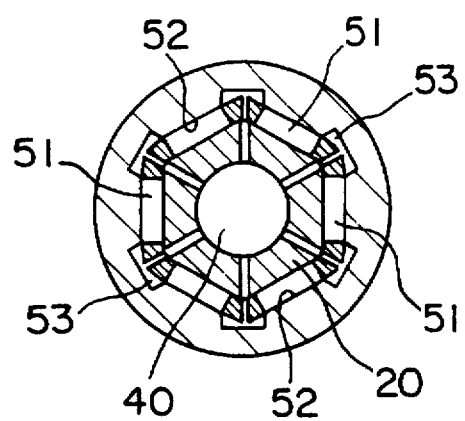
FIG. 11 is a cross-sectional view taken on line B—B in FIG. 10.

In FIGS. 10 and 11, the collet 20 has a regular, hexagonal cross section, and the chuck sleeve 14 is provided with bearing faces 52 respectively corresponding to the sides of the regular, hexagonal cross section of the collet 20. The bearing faces 52 are inclined at a small inclination to the axis of the chuck sleeve 14, and relief grooves 53 are formed between the adjacent bearing faces 52. The rollers 51 are arranged at equal longitudinal intervals on each bearing face 52, and the rollers 51 are held by the retainer 50. The retainer 50 is provided with lateral projections 54 at its upper end, and the lateral projections 54 are engaged with a shoulder formed in the inner circumference of the chuck sleeve 14 at the upper end of the taper bore 14d so that the retainer 50 may not fall off the chuck sleeve 14.

In a state shown in FIG. 10, a drive shaft 16 is pulled up to move the balls 36 up out of a releasing groove 14c and to pull up the collet 20 so that a pressure is applied through the rollers 51 to the taper surface of the collet 20 by the taper bore 14d of the chuck sleeve 14.

Figure 12:
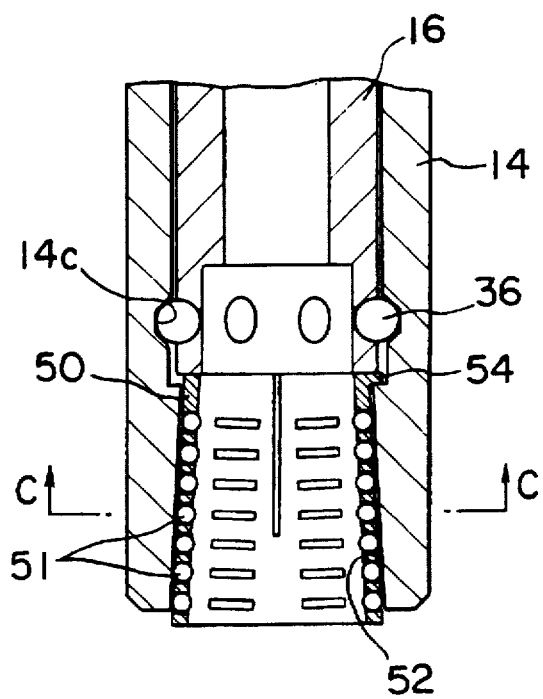
FIG. 12 is a fragmentary longitudinal sectional view of a portion of a cutting tool chuck in a third embodiment according to the present invention.
Figure 13:
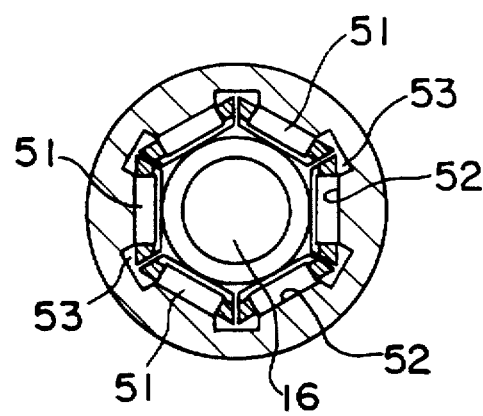
FIG. 13 is a cross-sectional view taken on line C—C in FIG. 12.

In a state shown in FIGS. 12 and 13, the balls are received in the releasing groove 14c, the lateral projections 54 rest on the shoulder formed at the upper end of the taper bore 14d of the chuck sleeve 14, and the collet 20 has been removed.

FIGS. 14 and 15 are a half sectional view and a bottom view, respectively, of the collet 20. The collet 20 has an outer surface resembling that of a frustum of a regular hexagonal pyramid, and a circular bore 20d for receiving a cutting tool 40. Slits 20d are formed in portions of the collet 20 having the shape of a frustum of regular hexagonal pyramid corresponding to the edges, and the slits 20b are packed with a packing members 37, respectively.

In addition to being capable of exerting an effect the same as that of the cutting tool chuck in the first embodiment, this cutting tool chuck is capable of transmitting a large torque to the cutting tool 40 for heaving machining because the cutting tool chuck is provided with the collet 20 having the shape of a frustum of polygonal pyramid.

The cross section of the collet is not be limited to a hexagonal cross section, but may be a square cross section or an octagonal cross section.

I claim:

1. A cutting tool chuck for chucking a cutting tool, comprising:

a holding member;

a chuck sleeve connected to the holding member and provided with an axial straight bore and a taper bore formed in its front end;

a fastening collar screwed on the chuck sleeve and provided with an inner annular guide groove, deep recesses formed in a side surface of the guide groove, and shallow recesses formed in the same side surface of the guide groove;

a drive shaft axially slidably fitted in the chuck sleeve and provided with a drive shaft control member having opposite end portions fitted in the guide groove and capable of being brought into engagement with the deep recesses or the shallow recesses of the fastening collar;

a collet detachably fitted in the taper bore of the chuck sleeve; and a spring member resiliently engaged with the back end of the drive shaft.

2. The cutting tool chuck for chucking a cutting tool, according to claim 1, wherein an annular groove of a large diameter is formed in a portion of the straight bore of the chuck sleeve, a collet receiving bore is formed in the front end of the drive shaft, a plurality of radial holes are formed in an annular wall defining the collet receiving bore and balls are retained in the radial bores of the annular wall so as to be radially movable between the inner and the outer circumference of the annular wall defining the collet receiving bore, the plurality of balls are pressed by the inner circumference of the chuck sleeve so as to protrude into the collet receiving bore to hold the collet when the drive shaft is pulled up, and the plurality of balls drop into the groove of a large diameter and are pushed out of the collet receiving bore to release the collet when the drive shaft is pushed down.

3. The cutting tool chuck for chucking a cutting tool, according to claim 1, wherein the collet has a polygonal cross section, the chuck sleeve is provided with bearing faces respectively corresponding to the sides of the polygonal cross section of the collet, and a plurality of rollers are held between the bearing faces of the chuck sleeve and the outer circumference of the collet by a retainer.

* * * * *